Figure 3:
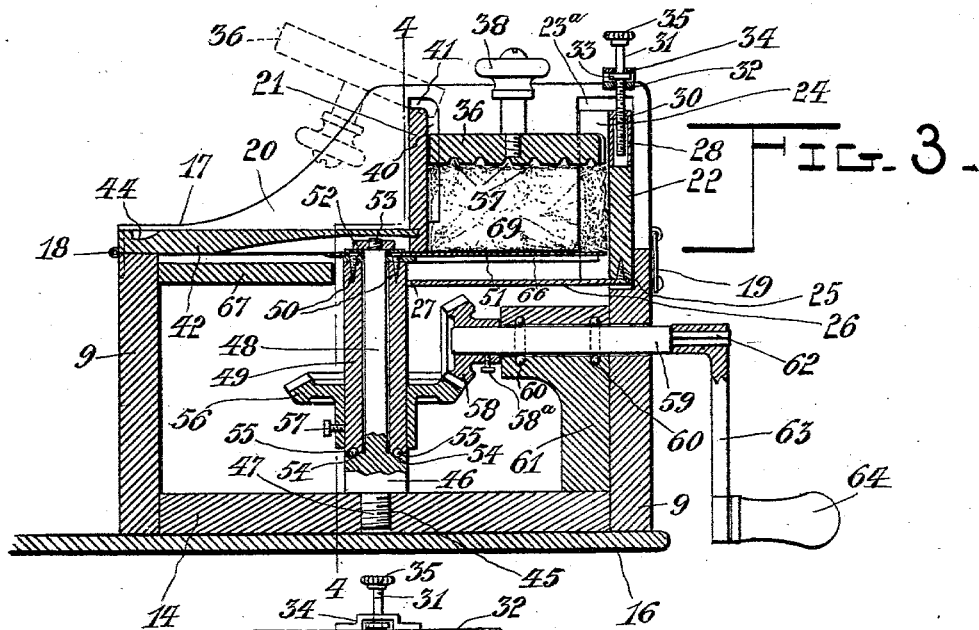

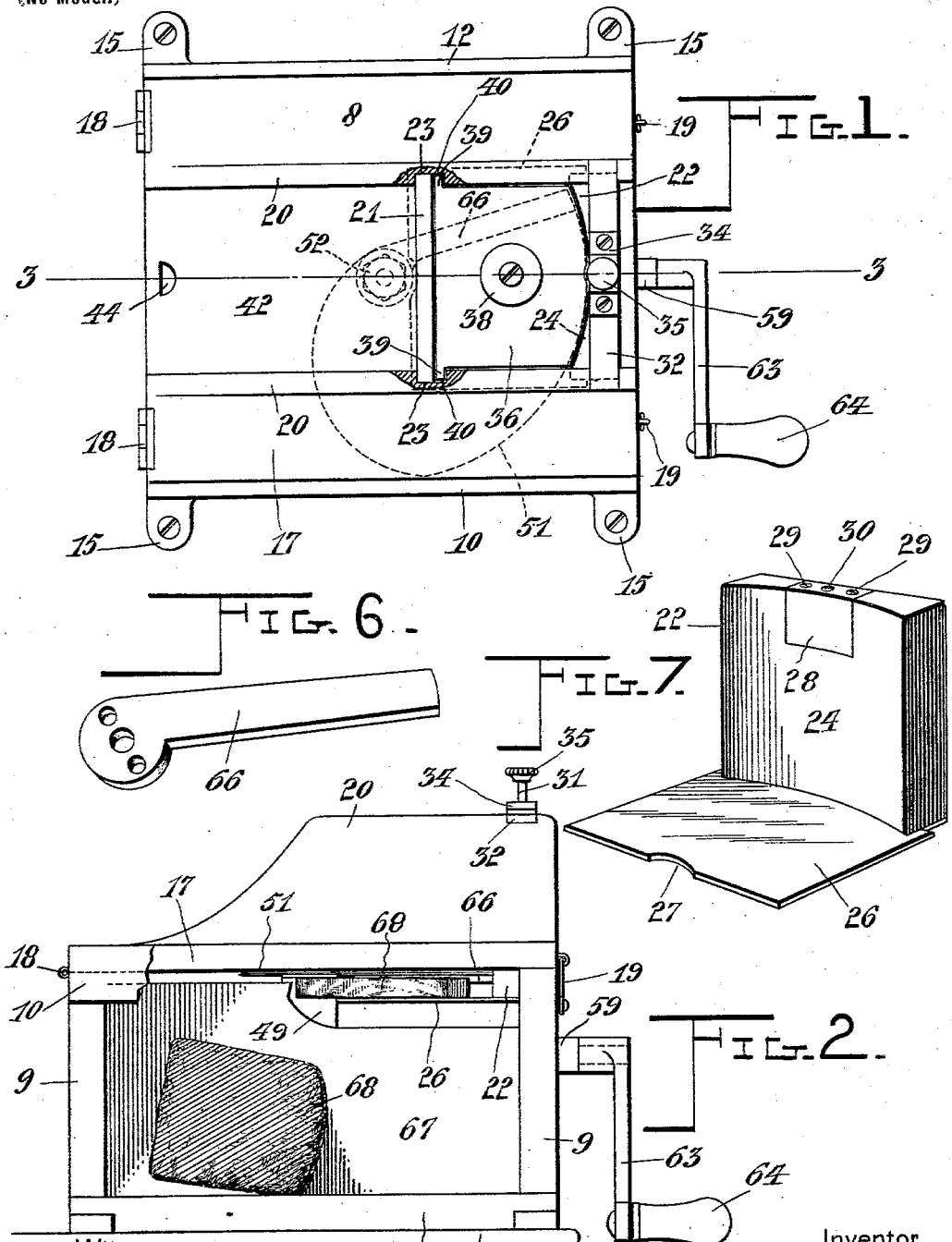

No. 715,168. Patented Dec. 2, 1902.
C. D. SPATES.
BREAD SLICER.
(Application filed Apr. 28, 1902.)

(No Model.) 2 Sheets—Sheet 2.

Witnesses
John F. Deufferwith
George W. Colles

Inventor,
Charles D. Spates,
By Marion & Marion
Attorneys

UNITED STATES PATENT OFFICE.

CHARLES D. SPATES, OF ROSSWAY, CANADA, ASSIGNOR TO BARTLETT C. GOODWIN, OF GRANVILLE, CANADA.

BREAD-SLICER.

SPECIFICATION forming part of Letters Patent No. 715,168, dated December 2, 1902.

Application filed April 28, 1902. Serial No. 104,923. (No model.)

*To all whom it may concern:*

Be it known that I, CHARLES D. SPATES, a subject of the King of Great Britain, residing at Rossway, county of Digby, Province of Nova Scotia, Canada, have invented certain new and useful Improvements in Bread-Slicers; and I do hereby declare that the following is a full, clear, and exact description of the invention, such as will enable others skilled in the art to which it appertains to make and use the same.

My invention relates to an apparatus for the rapid and regular slicing of bread and cake.

The object of my invention is to produce a slicer which can be rapidly operated to cut off successive slices from a loaf by the simple turning of a crank, and, further, to improve the construction of the apparatus, so that the slices shall be smoothly and accurately cut to a predetermined thickness and delivered as fast as cut upon one side of the machine.

To these ends my invention consists, substantially, in a box or casing having a quadrangular loaf-chamber which is adapted to receive a loaf therein and permit it to be pushed downwardly as fast as the slices are cut, and a rotary knife having a spiral cutting edge is arranged immediately beneath this chamber to rotate continuously, cutting off a slice at each revolution, and immediately after the slice is cut it is pushed out by a radial pusher on the rear of the knife, so as to permit the loaf to drop down ready for the action of the knife in cutting off the next slice on its next revolution, and I preferably provide a sloping delivery-board at one side of the casing, onto which the successive slices are arranged to be delivered.

My invention further consists in a sliding gage on which the lower end of the loaf is adapted to rest and above which the knife is adapted to pass in its rotation, and this gage is so made as to be adjustable to any desired thickness of slice, being arranged with a set-screw or any similar suitable mechanism for raising it and lowering it by small amounts.

My invention further consists in a weighted cover or lid adapted to rest upon the upper end of the loaf and weight it, so as to press it downwardly after each action of the knife, and which lid is arranged on sliding pintles, so as to permit it when raised out of the box to be turned backwardly, as on hinges, in order to permit the loaf to be removed or inserted without taking the lid entirely off from the box.

My invention further consists in the arrangement which I provide for rotating the knife, as well as in the special form of the knife, which latter is mounted upon a vertical rotating sleeve carrying a bevel-gear which meshes with another bevel-gear on a horizontal shaft and having a crank-handle at its outer end, all the rotating parts being arranged on ball-bearings, whereby to cause the apparatus to be worked with greater ease.

My invention further consists in the peculiar construction and combination of parts hereinafter described, and more particularly pointed out in the claims.

I have shown the preferred form of my improved bread-slicer in the accompanying drawings, wherein—

Figure 4:
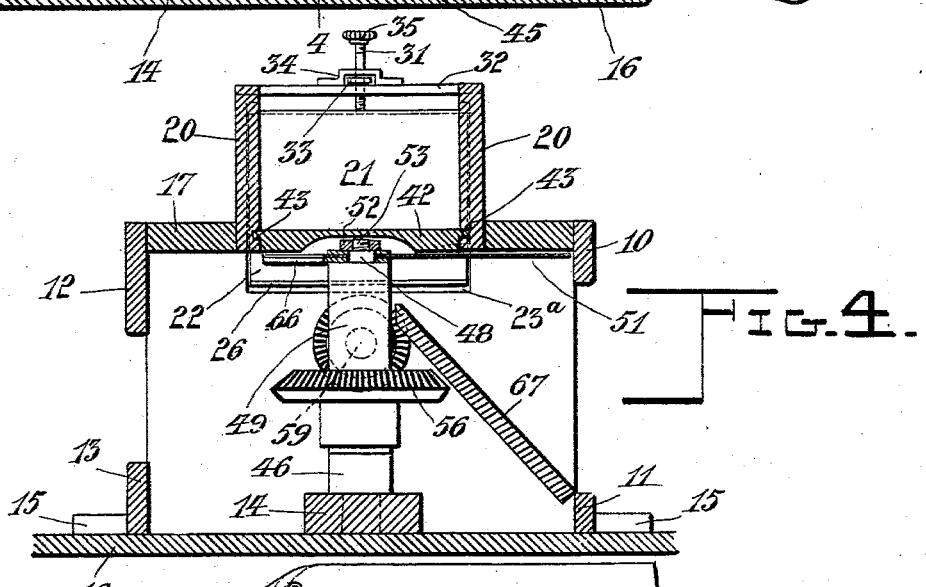
Figure 5:
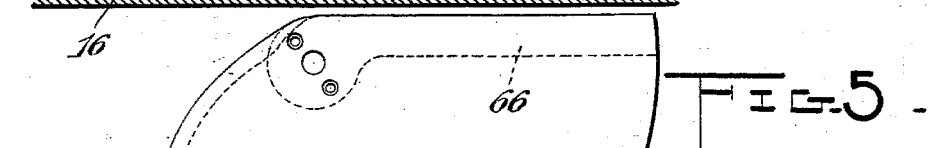

Figure 1 is a plan view of the complete apparatus. Fig. 2 is a side elevation thereof from the front or delivery side. Fig. 3 is a longitudinal vertical central section of the apparatus on the line 3 3 of Fig. 1. Fig. 4 is a transverse vertical section of the apparatus, taken on the line 4 4 of Fig. 3. Fig. 5 is a plan view of the knife. Fig. 6 is a perspective view of the pusher. Fig. 7 is a similar view of the gage.

The same numerals of reference denote like parts in all the figures of the drawings.

The apparatus consists, substantially, of a boxing or casing 8, which has a pair of end boards 9, closing the ends thereof and joined at their sides by strips 10 and 11 at the front and 12 and 13 at the back, respectively, and longitudinally through the center the boards 9 are connected at their lower sides by a tie-piece 14, and the corners of the apparatus may be provided with screw lugs or ears 15, adapted for securing the apparatus to a stationary object, as to a table 16. The upper side of the boxing 8 is closed by a suitable lid 17, which is of complex form, as shown in the drawings, and may preferably be hinged at one side, as at 18, and secured to the opposite end board 9 by means of hooks or other fastenings 19, so as to enable the lid to be readily opened for inspection of the knife and other parts which are mounted in the body of the casing 8.

The lid 17 is provided with a pair of longitudinal upstanding pieces 20 at a distance apart equal to the ordinary width of a loaf or the desired width of the chamber into which the loaf is to be inserted, which chamber is formed, as shown at the right side of the apparatus, by a pair of transverse boards 21 and 22, the former of which is stationary and firmly secured to the lid and to the upstanding pieces 20—as, for instance, in a suitable mortised groove 23 in the latter—but the board 22 is arranged to slide in a groove 23ª, formed in the right-hand end of each of the boards 20, and this board 22, as shown in Fig. 7, has a curved or dished form suitable to fit it to the shape of the top side of a loaf, as shown at 24. The board 22 forms a part of my adjustable slice-gage and has secured to its lower edge, by means of screws 25, a horizontal gage-plate 26, which is adapted to support the loaf during the slicing operation and is slightly recessed at its inner side, as shown at 27, to permit free rotation of the rotating parts, to be presently described. The upper edge of the board 22 is mortised to receive a metallic screw-plate 28, secured thereto by screws 29 and having through the center a vertical screw-threaded socket 30, which receives the threaded end of the gage-screw 31, which is rotatably mounted on a cross-piece 32 and has a thrust-collar 33, as shown, which is retained in its position by a cleat 34, so as to hold the screw 31 against longitudinal movement, and the set-screw 31 may be likewise provided with a milled head 35 for turning the same to raise and lower the gage-plate 26, according to the thickness of the slice desired.

The chamber formed between the boards 20, 21, and 22 is of the proper shape and size to receive a loaf, as stated, and in order to hold the loaf down against the plate 26 and to cause it to move downwardly positively after a slice is cut, so as to be ready for the next slice, I may provide a suitable weighted lid 36, which may be corrugated or pyramided on its lower side, as shown at 37, and is provided with a handle-knob 38 for removing the same. The lid 36 has at its sides projecting pintle-lugs 39, which operate in a groove 40, forming a continuation of the groove 23, whereby to enable the lid 36 to slide freely up and down in the loaf-chamber, and the groove 40 extends around the top of the board 21, as shown at 41, so that the lid 36 when raised will be turned about the pintle-lugs 39 as hinges and may be allowed to fall back into the position shown in dotted lines in Fig. 3. Thus in the ordinary operation of the device in putting in or taking out the loaf the lid 36 is held in its position and kept from being removed; but if it is desired to remove the same this may be readily done by tipping the lid sidewise, while it is in the position shown in full lines in Fig. 3, until one of the lugs 39 is turned out of the groove 40, when the lid may be removed altogether from the apparatus.

I have herein shown the lid or cover of the boxing 8 as preferably provided with a secondary sliding piece 42, which has lateral tongues 43 sliding in corresponding grooves in the upstanding boards 20, and at its outer side is provided with a finger-nick 44 to enable the same to be drawn out for the inspection of the upper end of the rotating parts, to be presently described.

Mounted in vertical position in the center of the casing 8 and in a screw-threaded socket 45, formed in the center of the tie-piece 14, is a vertical post 46, which has a projecting screw-threaded stud 47 at its lower end which coacts with and is secured in the socket 45, and the post 46 is reduced at its upper end to form a spindle 48, on which turns a sleeve 49, which is secured to its upper end by means of screws 50. The radial spiral-bladed knife 51 and the rotating parts are retained against vertical movement by a nut 52, screwed over a threaded stud 53 on the end of the spindle. The lower end of the post 46 has a radial shoulder 54 and is provided with ball-bearings 55, which run in a suitable raceway and support the sleeve 49 and the parts carried thereby antifrictionally.

Around the sleeve 49 and at the base thereof is secured a bevel-gear 56, which is clamped to the sleeve by a set-screw or other clamping means 57, and this bevel-gear 56 meshes with a bevel-pinion 58, mounted upon the inner end of the horizontal shaft 59 and is secured by a set-screw 58ª. The shaft 59 turns on ball-bearings 60 and in a longitudinal bearing-aperture formed in a bearing-block 61, which is fixed to the right-hand board 9 and rests at its lower end upon the tie-piece 14. The outer end of the shaft 59 is squared, as shown at 62, for the reception of a crank 63, having a handle 64, by means of which the knife 51, through the medium of the gearing, is rotated to cut the bread.

The knife 51 is shown in detail in Fig. 5 and, as shown, has a spiral cutting edge 65, which is preferably of the form of the geometrical curve known as the "logarithmic" spiral—a curve which, as is understood, has the peculiar property of making a constant angle with the direction of cutting, whereby a slice may be cut with uniform ease and smoothness on the rotation of the knife. The knife is of sufficient angular opening to permit of the slice being entirely cut before the rear edge arrives at the rear portion of the slice, and immediately beneath this rear edge is mounted a radial pusher 66, which is firmly secured to rotate with the knife and the sleeve 49 and the action of which is to push away the slice after it is cut on the continued rotation of the knife, whereupon the slice will be pushed off the gage-plate 26 and fall upon the delivery-board 67, which is arranged, as shown, in sloping position, extending from beneath the gage-plate 26 to the front of the casing 8, and the slice of bread (denoted by 68) will thus be delivered in the position shown in Fig. 2.

It is believed that the mode of operation of the device will now be clear, especially upon consideration of Figs. 2 and 3, which show the bread in the operation of being cut, and it will be seen that at each revolution of the knife a slice is cut from the loaf 69 in the loaf-chamber, and thereafter, by the continued rotation of the knife, the pusher 66 strikes against the lower side of the cut slice and pushes it onto the delivery-board, whereupon the loaf will be free to drop downwardly the distance of the thickness of another slice until it strikes the gage-plate 26 again, and this will continue until the loaf is all used up or until the operation of rotating the knife ceases, the loaf being pushed downwardly positively by the weighted cover 36. The gage-plate 26, as shown, is arranged to cut a slice of any desired thickness, from one-quarter to three-quarters of an inch, as may be desired.

While I have shown in the accompanying drawings the preferred form of my invention, it will be understood that I do not limit myself to the precise form shown, for many of the details may be changed in form or position without affecting the operativeness or utility of my invention, and I therefore reserve the right to make such modifications as are included in the scope of the following claims.

Having thus described my invention, what I claim as new, and desire to secure by Letters Patent, is—

1. A bread-slicer comprising a vertical chamber adapted to slidably receive a loaf, means for removing a slice from the lower end of the loaf, a weighted lid slidably movable in said chamber and adapted to press upon the upper end of the loaf, said lid having pintle-lugs at one side thereof moving in vertical grooves in the sides of the loaf-chamber and terminating near the top, whereby said lid is adapted to be raised and turned about the pintle-lugs as a hinge, an adjustable gage comprising a vertical board closing one side of the loaf-chamber and vertically slidable in grooves and a gage-plate secured to its lower side and projecting beneath the loaf, and a set-screw pivotally mounted in a cross-piece above the gage and turning in a threaded socket in the upper end thereof, whereby to adjustably regulate the thickness of the slice.

2. In a bread-slicer, an adjustable gage comprising a vertical board closing one end of the loaf-chamber and vertically slidable in grooves, a horizontal gage-plate projecting laterally therefrom, and a set-screw pivoted in a stationary part of the apparatus and engaging a socket in said gage to adjust the latter up and down.

3. A bread-slicer comprising a casing, a lid closing the top thereof and having a pair of upstanding boards, a second board joining said upstanding boards and forming one side of a loaf-chamber, a vertically-slidable board forming the opposite side and moving in grooves in said upstanding boards, a gage-plate fixed to and projecting horizontally from the lower end of said slidable board, a set-screw adapted to adjust said slidable board longitudinally up and down, a weighted lid slidably mounted in said loaf-chamber and having a pair of lateral pintles engaging in grooves in said upstanding boards, and a knife adapted to be advanced the thickness of a slice above said gage-board.

4. A bread-slicer comprising a casing, a lid closing the top thereof and having a pair of upstanding boards, a second board joining said upstanding boards and forming one side of a loaf-chamber, a vertically-slidable board forming the opposite side and moving in grooves in said upstanding boards, a gage-plate fixed to and projecting horizontally from the lower end of said slidable board, a set-screw adapted to adjust said slidable board longitudinally up and down, a weighted lid slidably mounted in said loaf-chamber and having a pair of lateral pintles engaging in grooves in said upstanding boards, a knife adapted to be advanced the thickness of a slice above said gage-board, and a pusher arranged to be advanced behind said knife and fixed to the lower side thereof.

5. A bread-slicer comprising a casing, a lid closing the top thereof and having a pair of upstanding boards, a second board joining said upstanding boards and forming one side of a loaf-chamber, a vertically-slidable board forming the opposite side and moving in grooves in said upstanding boards, a gage-plate fixed to and projecting horizontally from the lower end of said slidable board, a set-screw adapted to adjust said slidable board longitudinally up and down, a weighted lid slidably mounted in said loaf-chamber and having a pair of lateral pintles engaging in grooves in said upstanding boards, a rotatable knife mounted in a horizontal plane above said gage-plate, a pusher carried by the lower rear edge of said knife, and a sloping delivery-board on which the slices are adapted to fall when pushed out by said pusher.

6. A bread-slicer comprising a casing, a lid closing the top thereof and having a pair of upstanding boards, a second board joining said upstanding boards and forming one side of a loaf-chamber, a vertically-slidable board forming the opposite side and moving in grooves in said upstanding boards, a gage-plate fixed to and projecting horizontally from the lower end of said slidable board, a set-screw adapted to adjust said slidable board longitudinally up and down, a weighted lid slidably mounted in said loaf-chamber and having a pair of lateral pintles engaging in grooves in said upstanding boards, a vertical post having its upper end reduced to form a spindle and its lower end formed with a thrust-shoulder, ball-bearings carried by said thrust-shoulder, a tubular shaft mounted on said spindle and resting on said ball-bearings, a bevel-gear clamped to said tubular shaft, a spiral-bladed knife fixed to the upper end of said tubular shaft, a pusher mounted beneath the rear edge of said knife and also fixed to said shaft, a horizontal shaft mounted in ball-bearings, a bevel-gear pinion meshing with said bevel-gear and carried on the end of said horizontal shaft, and means for manually turning said horizontal shaft, substantially as described.

In witness whereof I have hereunto set my hand in the presence of two witnesses.

CHARLES D. SPATES.

Witnesses:
JOHN A. CLINTON,
FENWICK YOUNG.